(12) United States Patent
Hayashi et al.

(10) Patent No.: US 7,491,284 B2
(45) Date of Patent: Feb. 17, 2009

(54) MANUFACTURING METHOD OF RUBBER MEMBER FOR TIRE

(75) Inventors: Norio Hayashi, Kobe (JP); Toshihiko Omokawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 502 days.

(21) Appl. No.: 11/194,601

(22) Filed: Aug. 2, 2005

(65) Prior Publication Data

US 2006/0027309 A1 Feb. 9, 2006

(30) Foreign Application Priority Data

Aug. 3, 2004 (JP) ............... 2004-227018
Dec. 20, 2004 (JP) ............... 2004-368000

(51) Int. Cl.
*B29D 30/60* (2006.01)
(52) U.S. Cl. .................... 156/130; 156/117
(58) Field of Classification Search ......... 156/117, 156/130, 397, 195
See application file for complete search history.

(56) References Cited

U.S. PATENT DOCUMENTS

| 3,751,316 A | 8/1973 | Menough et al. |
| 4,551,806 A | 11/1985 | Storace et al. |
| 2005/0183810 A1 * | 8/2005 | Abe et al. ............ 156/117 |

FOREIGN PATENT DOCUMENTS

| EP | 0 854 054 A1 | 7/1998 |
| EP | 0 875 367 A2 | 11/1998 |
| EP | 1 020 284 A2 | 7/2000 |
| EP | 1 020 284 A3 | 7/2000 |
| EP | 1 033 236 A2 | 9/2000 |
| EP | 1 033 236 A3 | 9/2000 |
| EP | 1 375 118 A1 | 1/2004 |
| JP | 2001-191423 A * | 7/2001 |
| JP | 2002-079590 A | 3/2002 |
| JP | 2002-160508 A | 6/2002 |
| JP | 2000-094542 A | 4/2004 |
| WO | WO-03/041941 A1 | 5/2003 |
| WO | WO-03/051619 A1 | 6/2003 |
| WO | WO-03/070454 A1 | 8/2003 |

* cited by examiner

*Primary Examiner*—Geoffrey L Knable
(74) *Attorney, Agent, or Firm*—Birch, Stewart, Kolasch & Birch, LLP

(57) ABSTRACT

The invention can reduce a step between rubber strips even in the case that the rubber strip is made thick, and inhibits a reduction of uniformity and tire quality, a deterioration of a tire outer appearance, and the like. A rubber strip (10) may be scalene triangular shape, a trapezoidal shape or a parallelogram shape having has a bottom line (11) forming a strip width (W), a first diagonal line (12) extending from one end of the bottom line (11) and a second diagonal line (13) extending from the other end (P2) of the bottom line (11), a length (L0) of the bottom line is set to 5 to 50 mm, and a thickness (T) thereof is set to 0.2 to 5.0 mm.

3 Claims, 10 Drawing Sheets

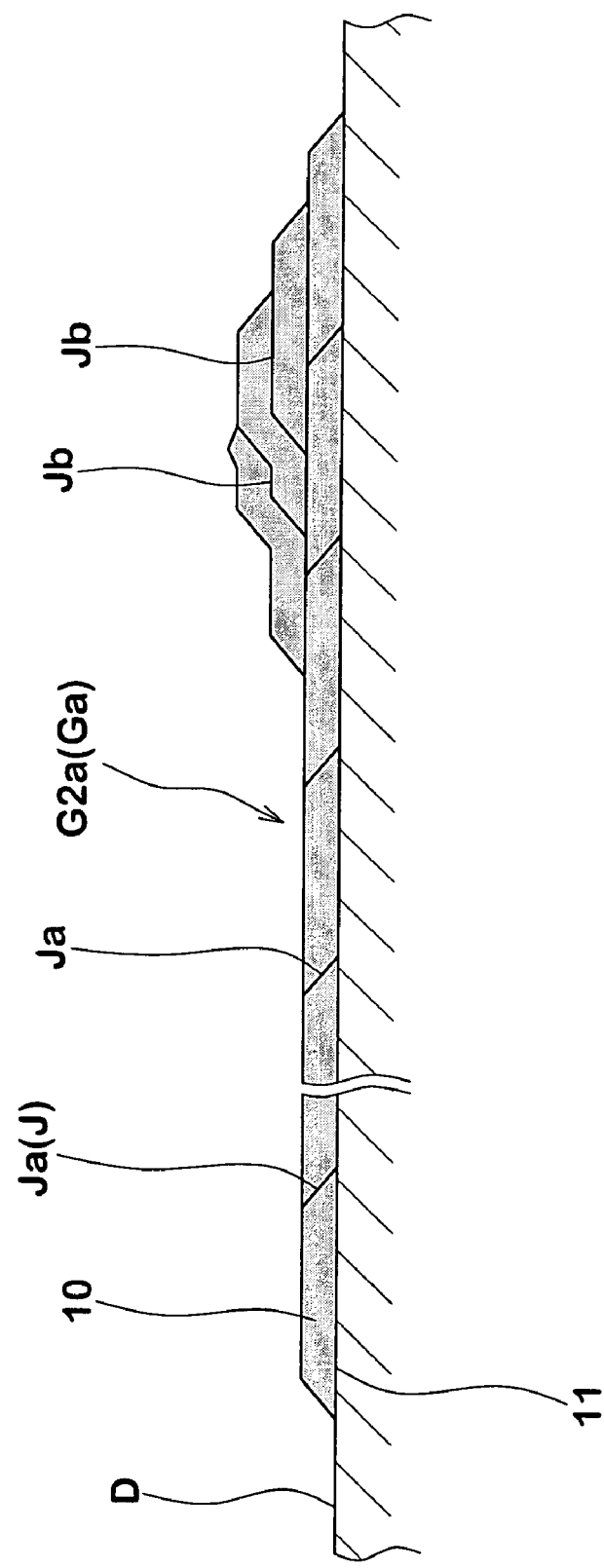

FIG.7(A)
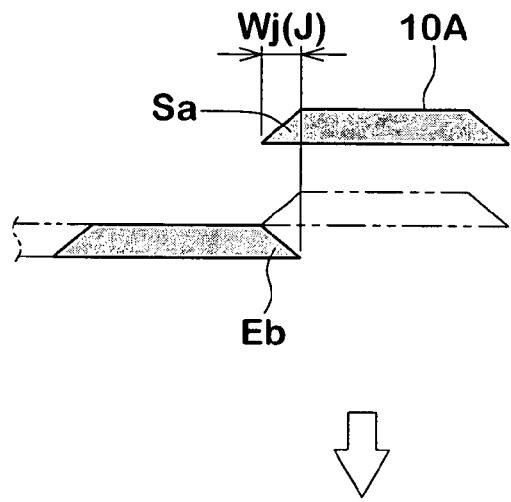
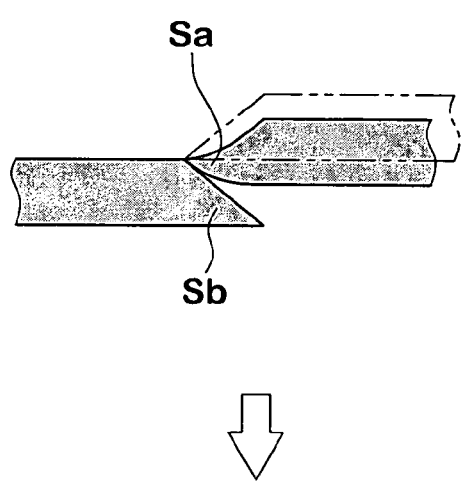
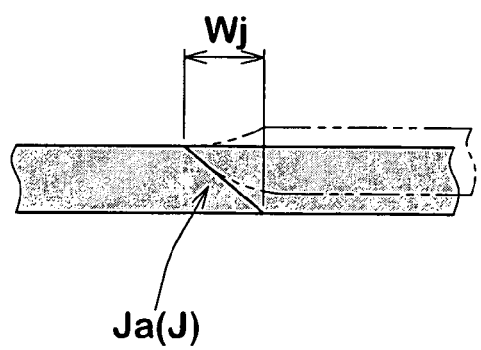
FIG.7(B)
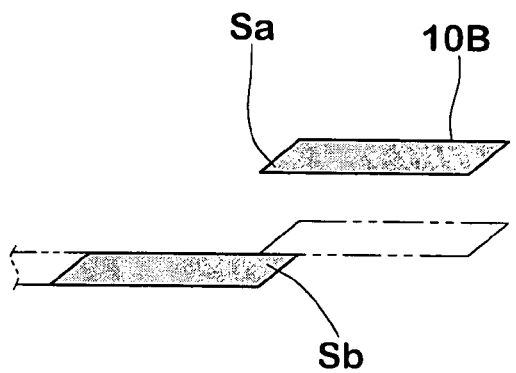
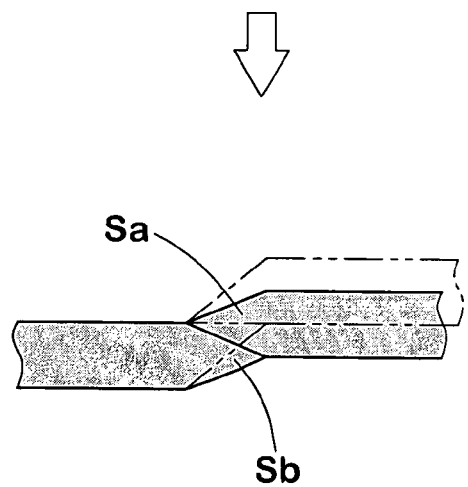
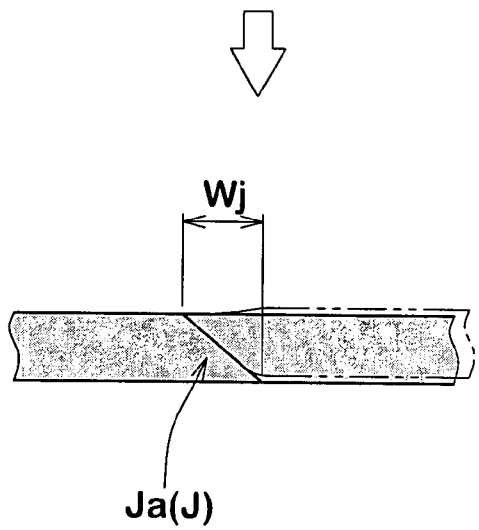

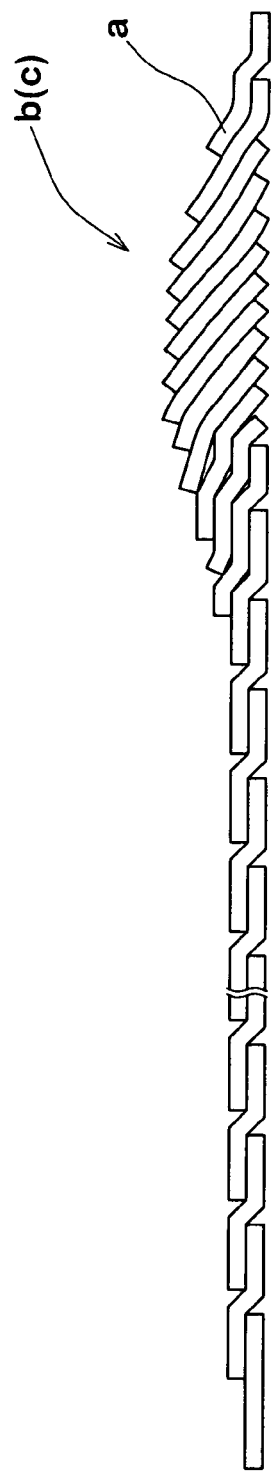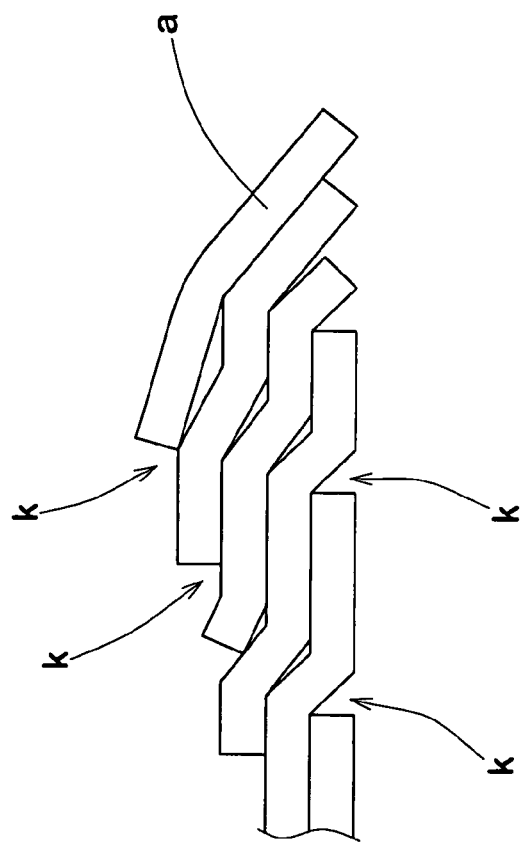
FIG.10(A)
FIG.10(B)

US 7,491,284 B2

MANUFACTURING METHOD OF RUBBER MEMBER FOR TIRE

BACKGROUND OF THE INVENTION

The present invention relates to a manufacturing method of a rubber member for tire by overlapping and winding a rubber strip in a circumferential direction and in a spiral shape.

In a pneumatic tire, there are employed various rubber members in which a composition and a cross sectional shape are differentiated in correspondence to a required characteristic of a used portion, for example, a tread rubber, a sidewall rubber, a clinch rubber, a breaker cushion rubber, an inner liner rubber or the like. Conventionally, as the rubber member, there has been used a formed body which is extrusion molded in a desired cross sectional shape of each of the rubber members by a rubber extruder or the like. In a raw tire forming step, each of the rubber members is formed by winding a cut-to-size sheet of the formed body around a forming drum or the like at one circuit.

On the contrary, in recent years, as exemplified in FIG. 10(A), there has been proposed a so-called strip wind method of forming a rubber member c by overlapping and winding a rubber strip a in a circumferential direction and in a spiral shape. As the proposal mentioned above, there are Japanese published patent application 2000-94542, Japanese published patent application 2002-187219, Japanese published patent application 2003-104013 and the like. In this strip wind method, a strip wind body b similar to a cross sectional shape of the rubber member c is formed by winding the rubber strip (a). The drawing illustrates a case that the rubber member (c) is for a side wall rubber. In accordance with this method, since a large-size rubber extruder is not required, and it is not necessary to store the formed body for the rubber member as an intermediate stock, there can be provided with an advantage in addition to a productivity, especially for the tire with a large item rather small scale production, such that a space saving can be achieved and the like.

On the other hand, in the strip wind method, it takes a time for winding the rubber strip. Accordingly, in order to intend to improve productivity, there can be considered to use the rubber strip (a) which has a large cross sectional area and is thick so as to reduce the winding number. However, making the rubber strip thick increases a step (k) in the surface of the strip wind body (wind body), as shown in FIG. 10(B) in an enlarged manner. Further, the increase of the step (k) generates an air remnant between the rubber member (c) and the adjacent other rubber member (c), a vulcanizing metal mold, a bladder or the like. They cause a reduction in uniformity and tire quality. Further, they are left as a scratch on a tire surface, and causes a deterioration in a tire outer appearance. Further, making thick makes it hard to obtain the rubber member having a desired cross sectional shape, thereby deteriorating a forming accuracy of the rubber member and a freedom of a formed shape.

BRIEF SUMMARY OF THE INVENTION

Accordingly, the present invention is based on using a strip having a non-rectangular cross sectional shape, as a rubber strip. Therefore, an object of the present invention is to provide a manufacturing method of a rubber member which can solve problems caused by conventionally making thick, that is, the reduction of the uniformity and the tire quality, the deterioration of the tire outer appearance, the reduction of the forming accuracy of the rubber member and the freedom of the formed shape, and the like, while intending to improve productivity of the rubber member. And the manufacturing method of the invention can reduce a step between rubber strips.

In the manufacturing method of the invention, a cross sectional shape of a rubber strip may be scalene triangular shape, a trapezoidal shape or a parallelogram shape having a bottom line forming a strip width W, a first diagonal line extending from one end of the bottom line and a second diagonal line extending from the other end P2 of the bottom line, a length L0 of the bottom line is set to 5 to 50 mm, and a thickness T thereof is set to 0.2 to 5.0 mm.

BRIEF DESCRIPTION OF THE SEVERAL VIEWS OF THE DRAWINGS

FIG. 5 is a cross sectional view exemplifying a case that the rubber strip forms a sidewall rubber (a rubber member);

FIGS. 7(A) and 7(B) are cross sectional views showing a forming process of an end overlapped portion in a case that the rubber strip has a trapezoidal cross sectional shape, and a case that the rubber strip has a parallelogram cross sectional shape;

FIGS. 10(A) and 10(B) are cross sectional views explaining a conventional winding structure.

DETAILED DESCRIPTION OF THE INVENTION

Figure 1:
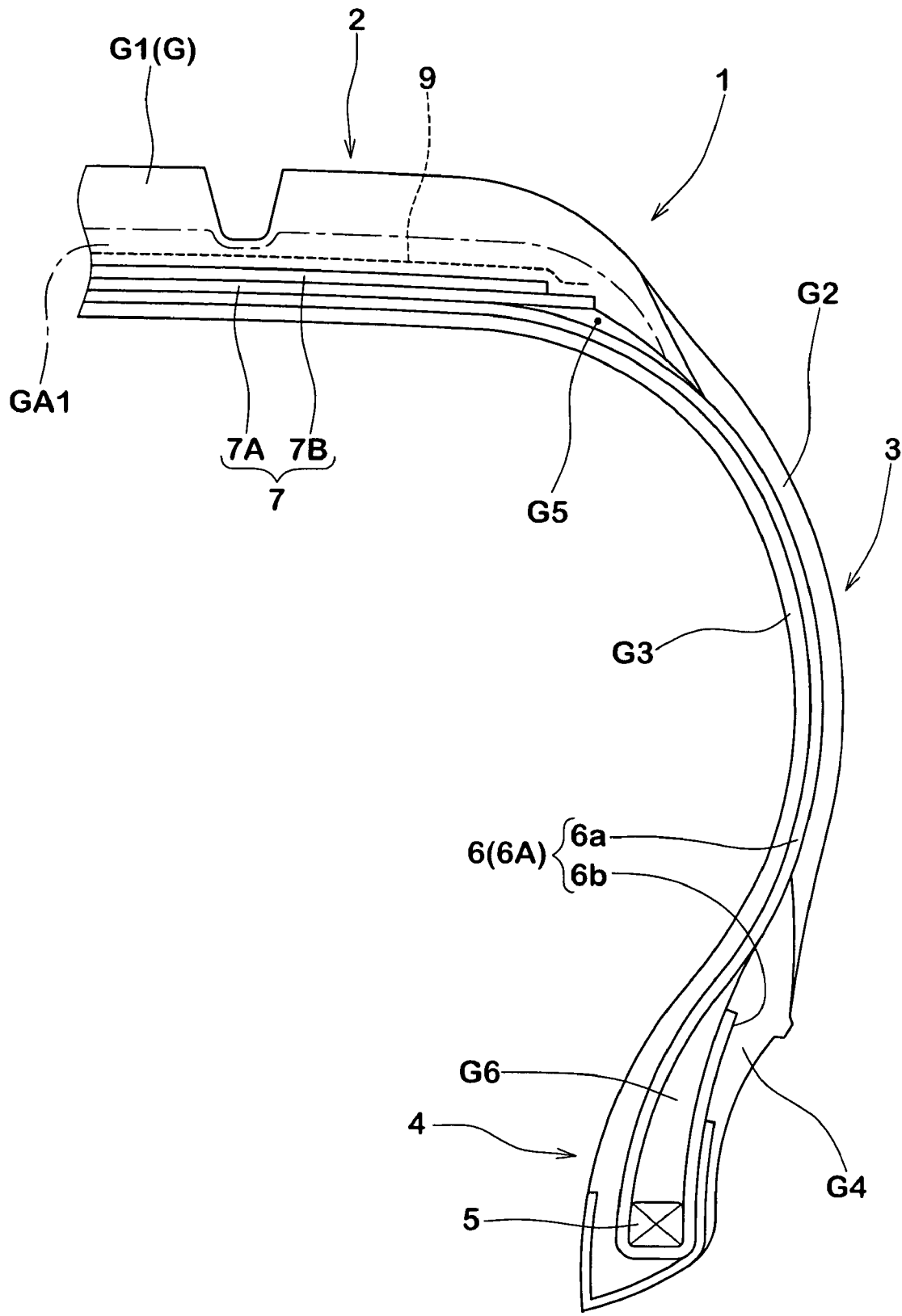
FIG. 1 is a cross sectional view showing an embodiment of a pneumatic tire using a rubber member manufactured in accordance with a manufacturing method of the present invention.

A description will be given below of an embodiment in accordance with the present invention together with an illustrated embodiment. FIG. 1 is a cross sectional view showing an embodiment of a pneumatic tire manufactured in accordance with a manufacturing method of the present invention.

In FIG. 1, a pneumatic tire 1 is formed so as to be provided with a cord reinforcing layer including a carcass 6 forming a framework of a tire and a belt 7 arranged in an inner side of a tread portion 2 and in an outer side in a radial direction of the carcass 6. Further, the pneumatic tire 1 is provided with plural kinds of rubber members G in which a rubber composition is differentiated, and the rubber member G can include a tread rubber G1 arranged in the tread portion 2 and forming a ground surface, a sidewall rubber G2 arranged in a sidewall portion 3 and forming a tire outer surface, an inner liner rubber G3 arranged in an inner side of the carcass 6 and forming a tire cavity, a clinch rubber G4 arranged in a bead portion 4 and preventing a rim wearing, a belt cushion rubber G5 arranged in both ends of a belt 7 and with respect to the carcass 6 and protecting a belt outer end, and a bead apex rubber G6 extending to an outer side in a radial direction from a bead core 5.

The carcass 6 is constituted by one or more carcass ply in which a carcass cord is arranged at an angle, for example 70 to 90° with respect to a tire circumferential direction, one carcass ply 6A in the present embodiment. The carcass ply 6A is continuously provided with a ply turnback portion 6b which is turned back around the bead core 5, in both sides of a ply main body portion 6a which extends to the bead core 5 of the bead portion 4 from the tread portion 2 via the sidewall portion 3.

Further, the belt 7 is constituted by two or more belt plies in which a belt cord is arranged at an angle, for example, 10 to 35° with respect to the tire circumferential direction, two belt plies 7A and 7B in the present embodiment, and the belt cords intersect alternately between the plies, thereby improving a belt rigidity and firmly reinforcing the tread portion 2. In this case, an outer side of the belt 7 can be provided with a band 9 in which a band cord is arranged along the tire circumferential direction, mainly for the purpose of improving a high-speed running performance.

Figure 2A:
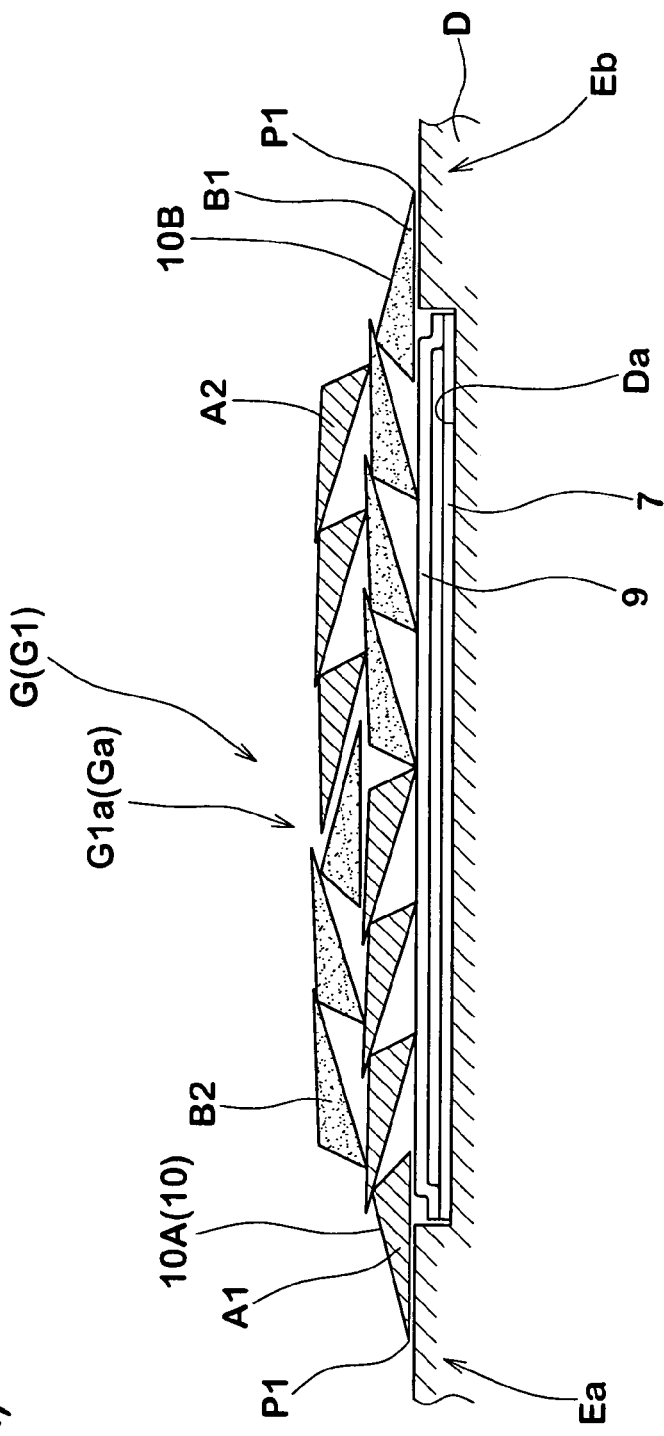
FIG. 2(A) is a cross sectional view showing a case that a rubber strip forms a tread rubber (a rubber member)
Figure 2B:
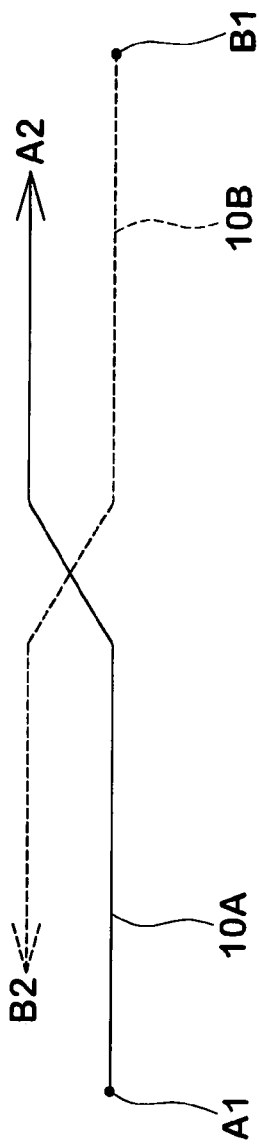
FIG. 2(B) is a graph showing a direction in which the rubber strip is wound.

Further, at least one of the rubber members G1 to G6 is formed by using a wind body (strip wind body) Ga in accordance with a strip wind method. In FIG. 2, the rubber member G is constituted as the tread rubber G1, and the tread rubber G1 is formed by using a wind body G1a. The wind body G1a is formed by sequentially overlapping and winding an unvulcanized rubber strip 10 in a circumferential direction and in a spiral shape. In this case, FIG. 2 exemplifies a winding gap between the rubber strips 10 in a largely exaggerated form. The outer circumferential surface of a forming drum (former) D and an outer circumferential surface of the band 9 after sequentially forming the belt 7 within a recess portion Da in a circumferential direction provided in the outer surface of the forming drum D, can be flattened, as shown in FIG. 2. The wind body G1a for the tread rubber G1 can be formed by winding the rubber strip 10 on the flattened outer circumferential surface. In this case, the structure is not limited to the structure in which the belt 7 and the band 9 are arranged in the recess portion Da as mentioned above.

Figure 3A:
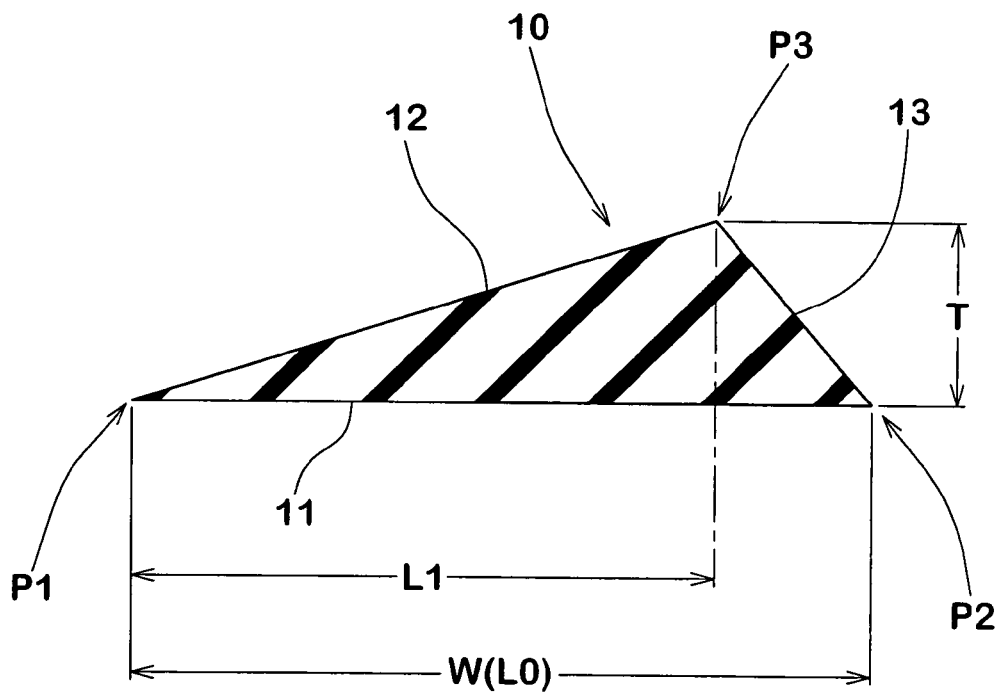
FIG. 3(A) is a cross sectional view showing an embodiment of the rubber strip.

Further, in accordance with the present invention, as shown in FIG. 3(A), the rubber strip 10 is formed in a triangular cross sectional shape. It becomes possible to increase a cross sectional area of the rubber strip 10 and improve a productivity of the rubber member G, by using such rubber strip 10. Further, it is possible to improve uniformity of the tire, to prevent a reduction of tire quality and a deterioration of a tire outer appearance, and to reduce a lowering of a forming accuracy of the rubber member G and a freedom of a formed shape.

The rubber strip 10 has a bottom line 11 forming a strip width W, a first diagonal line 12 extending from one end (apex) P1 of the bottom line 11 so as to be terminated, and a second diagonal line 13 extending from the other end (apex) P2 of the bottom line 11 so as to be terminated, in a transverse section. Further, in accordance with the present embodiment, the first diagonal line 12 and second diagonal line 13 terminate at the same end (facing apex) P3, whereby the cross section of the rubber strip 10 is formed in a triangular shape in this embodiment as mentioned above. Further, the cross section of the rubber strip 10 is formed in a scalene triangular shape by making the second diagonal line 13 shorter than the first diagonal line 12. In other words, it is formed in a left-right asymmetry. Further, the rubber strip 10 is structured such that a strip width W corresponding to a length L0 of the bottom line 11 is set to equal to or more than 5 mm and equal to or less than 50 mm, and a thickness T thereof is equal to or more than 0.2 mm, equal to or less than 5.0 mm. Preferably, the length L0 is 15 to 40 mm, and the strip thickness T is set to 0.8 to 3.0 mm. Further, a length L1 of the first diagonal line 12 along the bottom line 11 is set larger than 0.5 times and equal to or less than 0.8 times the length L0 of the bottom line.

Figure 4:
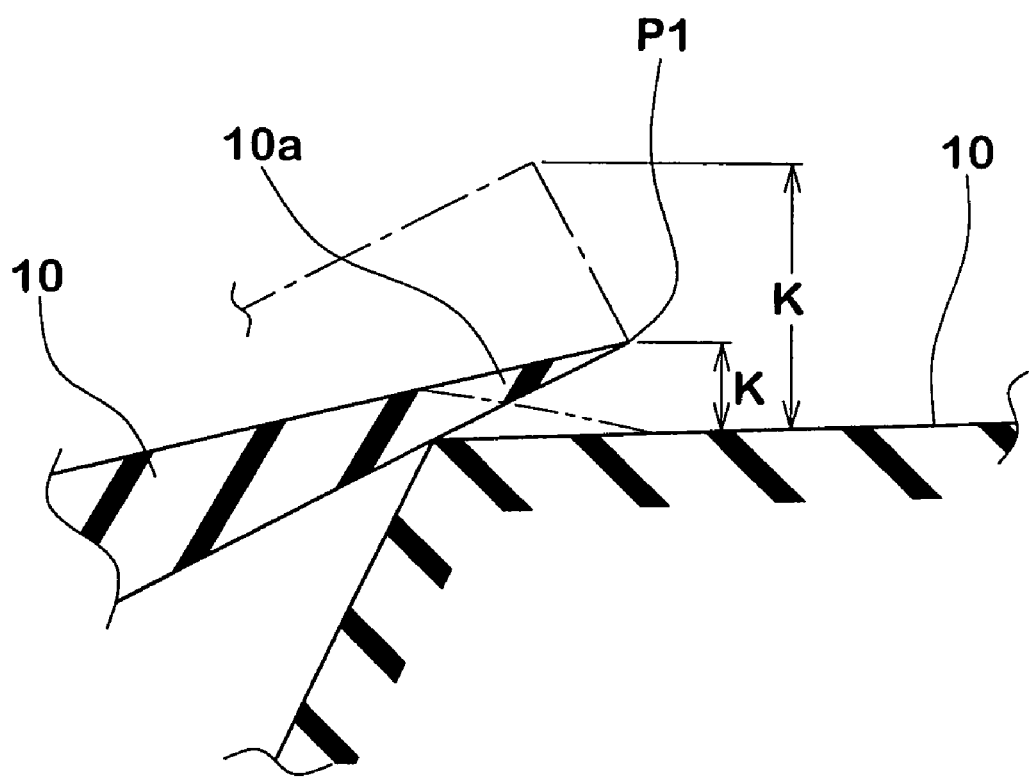
FIG. 4 is a cross sectional view explaining an operation of the present invention.

It is possible to make the thickness T larger to some extent so as to increase a cross sectional area. Further, as shown in FIG. 4 in an enlarged manner, it is possible to reduce a step K between the adjacent rubber strips 10 and 10 in comparison with a conventional step K' (shown by a chain line). Further, an overlapping portion 10a can be formed as a tapered shape, and can be easily deformed along the adjacent rubber strip 10. Accordingly, it is possible to form the wind body Ga having the smooth outer surface shape while reducing the winding number so as to intend to improve the productivity. Accordingly, it is possible to inhibit the reduction of the tire uniformity and the tire quality, the deterioration of the tire outer appearance, and the like. In particular, since the "scalene" shape can make the overlapping portion 10a sharp, it serves for smoothening the outer surface shape. Further, the tapered portion is easily deformed and can efficiently remove the residual air.

Further, in the rubber member G in each of the portions in tire, there is a case that a profile in which at least one end is formed in a sharp edge shape, that is, in a tapered cross sectional shape is required. Since the rubber strip 10 is formed in the "scalene" shape as mentioned above, a taper degree of the end portion of the rubber strip 10 can be small, so that the rubber strip 10 is easily deformed. Accordingly, it is possible to easily and accurately prepare the rubber member G in which the end portion is formed in the tapered shape.

In the case of forming the rubber member G having a bilaterally symmetrical profile such as the tread rubber G1, there is employed, for example, the first and second rubber strips 10A and 10B in which the cross sectional shape is line symmetrical with respect to the radial direction line, as shown in FIG. 2. In particular, the first rubber strip 10A is wound from a wind start position A1 close to one end Ea of the rubber member G to a wind end position A2 close to the other end Eb. Further, the second rubber strip 10B is wound from a wind start position B1 close to the other end Eb of the rubber member G to a wind end position B2 close to the one end Ea. During the winding, the first and second rubber strips 10A and 10B pass each other in a radial direction near a tire equator. Further, the one end P1 of the bottom line 11 in each of the first and second rubber strips 10A and 10B is directed to an outer side in an axial direction, in each of the wind start positions A1 and B1. Accordingly, the "passing each other" forming the wind body G1a having the bilateral symmetrical profile in which both ends Ea and Eb are formed in the sharp edge shape arranges the start positions A1 and B1 of the first and second rubber strips 10A and 10B in both ends, and makes the rubber strips 10A and 10B cross each other without being collided with each other so as to run on the other. In other words, phases in a circumferential direction of the wind start positions A1 and B1 are differentiated, preferably at 90° or more, for example, about 180°. Accordingly, it is possible to prevent the supply lines of the rubber strips 10A and 10B from being intersected as seen from the axial direction. In this case, the rubber strips 10A and 10B per se are not necessarily line symmetrical, but can select a line asymmetrical shape which is partly different between right and left sides, in accordance with a purpose.

As mentioned above, the length L0 of the bottom line 11 is set to equal to or more than 5 mm and equal to or less than 50 mm, and a thickness T thereof is equal to or more than 0.2 mm and equal to or less than 5.0 mm. Further, a length L1 of the first diagonal line 12 along the bottom line 11 is set larger than 0.5 times and equal to or less than 0.8 times the length L0 of the bottom line.

In this case, when the length L0 is less than 5 mm, and the thickness T is less than 0.2 mm, the cross sectional area is too small, so that the effect of improving the productivity of the rubber member G can not be sufficiently achieved. Further, when the length L0 is larger than 50 mm, and the thickness T is larger than 5.0 mm, a freedom of the formed shape is deteriorated such that the formable cross sectional shape of the wind body is limited, and a reduction of forming precision is caused such that the difference in shape from the desired cross sectional shape is enlarged. Therefore, it is preferable to adopt the length LO of 15 to 40 mm, and the strip thickness T set to 0.8 to 3.0 mm. In this case, a ratio T/L0 between the length L0 and the thickness T is preferably set to 0.02 to 0.2.

In the case that the ratio L1/L0 between the length L1 and the length L0 is larger than 0.8, the cross sectional shape of the rubber strip 10 tends to impair the freedom of the formed shape and the precision of forming. Accordingly, it is more preferable that the ratio L1/L0 is in the range of 0.6 to 0.7.

Figure 3B:
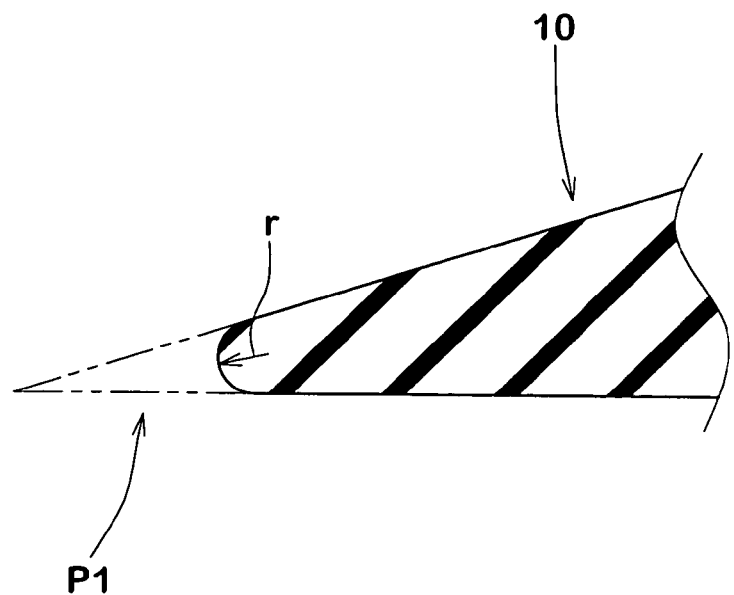
FIG. 3(B) is a cross sectional view showing an apex of the rubber strip in an enlarged manner.

Further, in the rubber strip 10, if each of the apexes P1 to P3 in the cross section is too sharp, the rubber strip 10 tends to be deformed and is inferior in a shape stability. Further, there is a risk that the forming precision of the rubber member G is reduced. Accordingly, as shown in FIG. 3(B) exemplifying the apex P1, it is preferable to form each of the apexes P1 to P3 by a circular arc having a radius r of 0.2 to 1.0 mm.

In this case, this embodiment exemplifies the case of forming the tread rubber G1. However, the present invention can be employed for forming various rubber members G such as a sidewall rubber G2, an inner liner rubber G3, a clinch rubber G4, a belt cushion rubber G5 and a bead apex rubber G6.

FIGS. 5 to 9 exemplify a case that the sidewall rubber G2 among the rubber members G1 to G6 is formed in accordance with a strip wind method. As schematically shown in FIG. 2, the unvulcanized rubber strip 10 is sequentially overlapped and wound around the former D in the circumferential direction and in the spiral shape, and the wind body G2a used for forming the sidewall rubber G2 is formed.

Figure 6A:
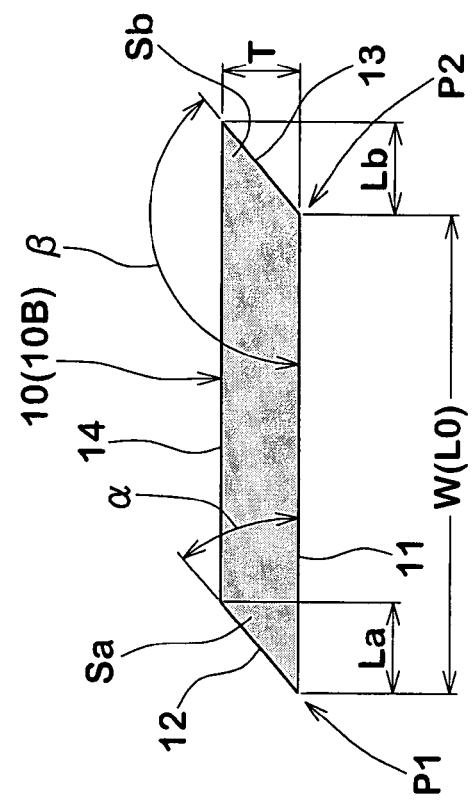
FIGS. 6(A) and 6(B) are cross sectional views respectively showing the other embodiments of the rubber strip.
Figure 6B:
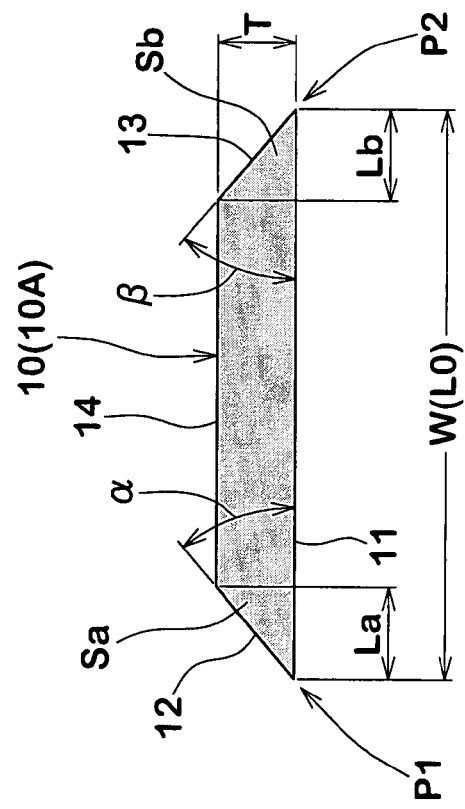

In accordance with this embodiment, the rubber strip 10 is formed in a trapezoidal cross sectional shape or a parallelogram shape, as shown in FIGS. 6(A) and 6(B). Accordingly, it is possible to inhibit the reduction of the tire uniformity and the tire quality and the deterioration of the tire outer appearance.

In detail, the rubber strip 10 has a bottom line 11 forming a strip width W, a first diagonal line 12 extending from one end P1 of the bottom line so as to be terminated, and a second diagonal line 13 extending from the other end P2 of the bottom line 11 so as to be terminated, in a cross section.

Further, in FIG. 6(A), an angle α formed between the first diagonal line 12 and the bottom line 11, in the rubber strip 10, is set larger than 45° and equal to or smaller than 80°. Further, an angle β formed between the second diagonal line 13 and the bottom line 11, is set larger than 45° and equal to or smaller than 80°. Further, the rubber strip 10A is formed in a trapezoidal shape in the present embodiment by combining the terminal points of the first and second diagonal lines 12 and 13 by an upper line 14 which is parallel, in the present embodiment, to the bottom line 11. Further, the first and second diagonal lines 11 and 12 form tapered taper portions Sa and Sb, each having a tapered shape and formed by the first diagonal line 12 and the bottom line 11.

In the case shown in FIG. 6(B), the angle α between the first diagonal line 12 and the bottom line 11 is set larger than 45° and equal to or smaller than 80°. Further, the angle β between the second diagonal line 13 and the bottom line 11 is set equal to or larger than 100° and smaller than 135°. Further, the rubber strip 10B is formed in a parallelogram shape in the present embodiment by combining the terminal points of the first and second diagonal lines 12 and 13 by the upper line 14 which is parallel, in the present embodiment, to the bottom line 11. This rubber strip 10B forms as well, taper portions Sa and Sb respectively.

Therefore, it is preferable to adopt the length LO of 15 to 40 mm, and the strip thickness T set to 0.8 to 3.0 mm. In this case, a ratio T/L0 between the length L0 and the thickness T is preferably set to 0.02 to 0.2.

In this case, in each of the rubber strips 10A and 10B, the length L0 (corresponding to the strip width W) of the bottom line 11 is set to a range equal to or more than 5 mm and equal to or less than 50 mm, and the thickness T is set to a range equal to or more than 0.2 and equal to or less than 5.0 mm.

The rubber strip 10 generates an overlap portion J overlapping the first diagonal line 12 of a rubber strip 10 and the second diagonal line 13 of the adjacent rubber strips 10 in the width direction, as shown in FIGS. 7(A) and 7(B), at the time of winding. The overlap portion J is set such as to generate an end overlap portion Ja in which a width Wj along the bottom line 11 is equal to or more than 0.8 times and equal to or less than 1.2 times an average value L (=(La+Lb)/2) of respective lengths La and Lb (shown in FIG. 6) of the first diagonal line 12 and the second diagonal line 13 along the bottom line 11, by an end of the overlap. The winding as mentioned above serves for forming the rubber member in a sheet shape. Accordingly, in addition to the main portion of the sidewall rubber G2 mentioned above, it is effective for forming the inner liner rubber G3, the base portion G1A of the tread rubber G1 and the like.

As mentioned above, taper portions Sa and Sb, each having a tapered shape, are formed, by the first diagonal line 12 and the bottom line 11, and the second diagonal line 13 and the bottom line 11, respectively. Accordingly, in the end overlap portion Ja, in the case that the rubber strip 10 has the trapezoidal shape, the taper portion Sa of the latterly wound rubber strip 10A is bonded while being deformed, by the taper portion Sb of the precedently wound rubber strip 10A, as shown in FIG. 7(A). Accordingly, a height of the end overlap portion Ja is made smaller in comparison with the case that the rubber strips having a simple rectangular shape are overlapped in the end portion.

As a result, it is possible to smoothen an outline shape of the rubber member G. Further, it is possible to inhibit the step and the gap from being generated, and it is possible to inhibit the reduction of the tire uniformity and the tire quality and the deterioration of the tire outer appearance.

Further, in the case that the rubber strip 10 has the parallelogram shape, since both the taper portion Sb close to the second diagonal line 13 of the precedently wound rubber strip 10B and the taper portion Sa close to the first diagonal line 12 of the latterly wound rubber strip 10B are bonded while being deformed, as shown in FIG. 7(B), it is possible to inhibit the step and the gap from being generated, in the same manner.

The operation and effect mentioned above can be achieved even in the case that the rubber strip 10 is made thick, and it is possible to raise the upper limit of the thickness T of 4.0 to 6.0 mm, preferably 5.0 mm which is larger than the conventional one.

In this case, when the width Wj of the end overlap portion Ja is less than 0.8 times the average value L, there is a tendency that the gap is large and a bonding strength is deteriorated. On the contrary, if it is more than 1.2 times, an increase of the step is caused.

Further, in the case of the trapezoidal shape, the angles α and β larger than 80° make the taper portions Sa and Sb hard to be deformed, and make the step and the gap hard to be inhibited from being generated. Further, it becomes difficult to sufficiently secure the width Wj of the overlap portion Ja. On the contrary, if the angles α and β are equal to or less than 45°, the taper portions Sa and Sb are easily deformed, it is hard to handle the rubber strip 10 at the time of extrusion molding, carrying and winding the rubber strip 10, a yield ratio of a product, and productivity is deteriorated.

Further, in the case of the parallelogram shape, if the angle α is larger than 80°, and the angle β is equal to or less than 100°, the taper portions Sa and Sb are hard to be deformed, and it is hard to inhibit the step and the gap from being generated. Further, it becomes hard to sufficiently secure the width Wj of the end overlap portion Ja. On the contrary, if the angle α is equal to or less than 45° and the angle β is equal to or more than 135°, the taper portions Sa and Sb are easily deformed, and in the same manner as the case of the trapezoidal shape, the reduction of the production efficiency is caused.

In the case of the trapezoidal shape, it is preferable that the lower limit values of the angle α and the angle β are set equal to or more than 47.5° and further equal to or more than 50°, and the upper limit values thereof are set equal to or less than 75° and further equal to or less than 70°. Further, in the case of the parallelogram shape, it is preferable that the lower limit value of the angle β is set equal to or more than 105° and further equal to or more than 110°, and the upper limit value thereof is set equal to or less than 132.5° and further equal to or less than 130°.

Further, in order to inhibit the deformation of the rubber strip 10 at the time of forming, carrying and winding, it is preferable to form the leading ends of the taper portions Sa and Sb in the rubber strip 10 by the circular arc having the radius of 0.2 to 1.0 mm, in the same manner as the embodiment mentioned above. In the case that the taper portion Sa and Sb have an acute angle equal to or less than 45°, the circular arc is hard to be maintained, and a chamfer shape becomes unstable. Further, since the taper portions Sa and Sb themselves are easily deformed, the deformation inhibiting effect can not be sufficiently achieved even if the leading end is formed in the circular arc.

Figure 8A:
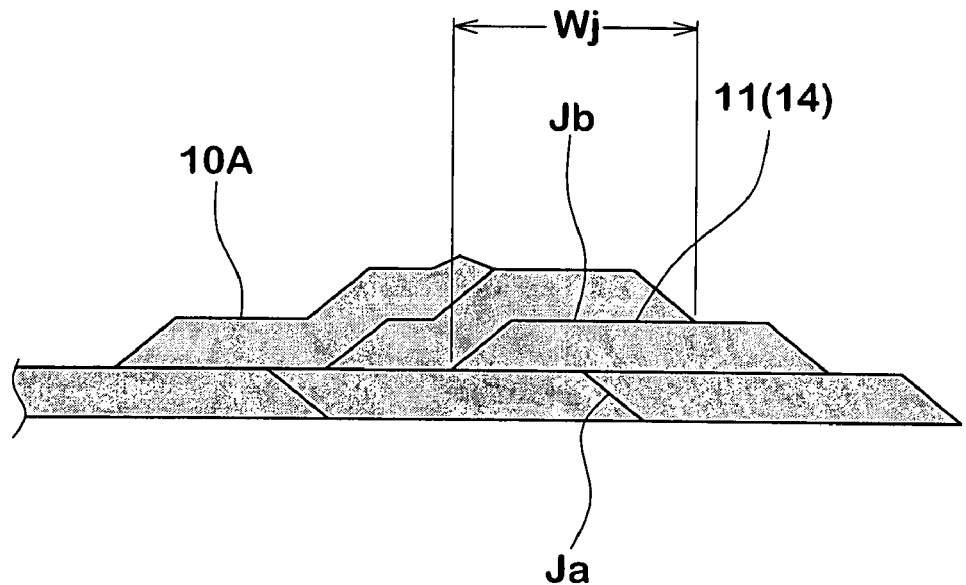
FIGS. 8(A) and 8(B) are cross sectional views showing an overlapped portion in a case that the rubber strip has a trapezoidal cross sectional shape, and a case that the rubber strip has a parallelogram cross sectional shape.
Figure 8B:
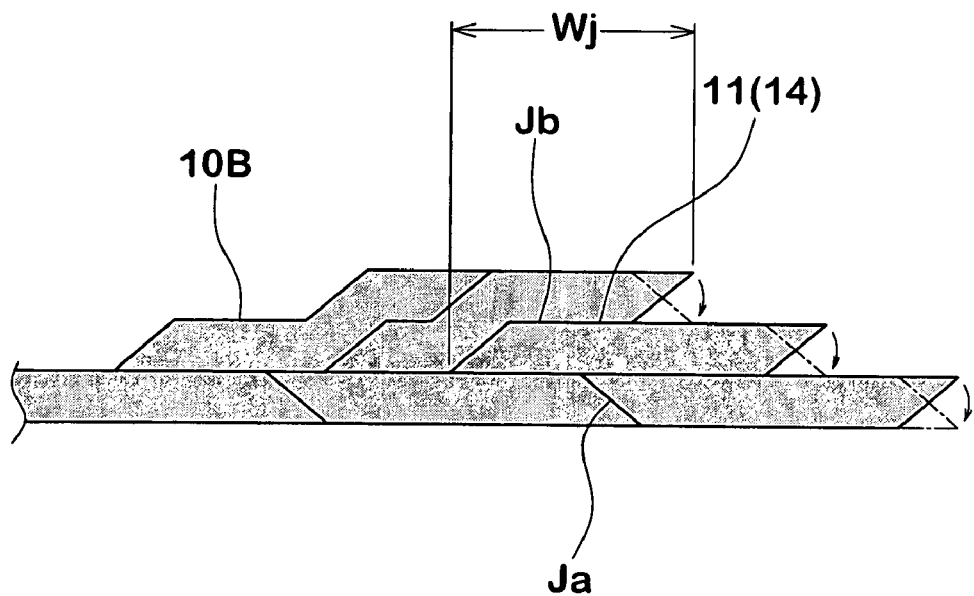

Further, in accordance with the present invention, as shown in FIGS. 8(A) and 8(B), it is possible to make the width Wj larger than 1.2 times the average value L, and it is possible to wind the rubber strip 10 while having the wide overlap portion Jb in which the bottom line 11 and the upper line 14 are overlapped. In the case mentioned above, the outline shape of the rubber member G becomes smooth, and it is possible to inhibit the step and the gap from being generated.

Figure 9:
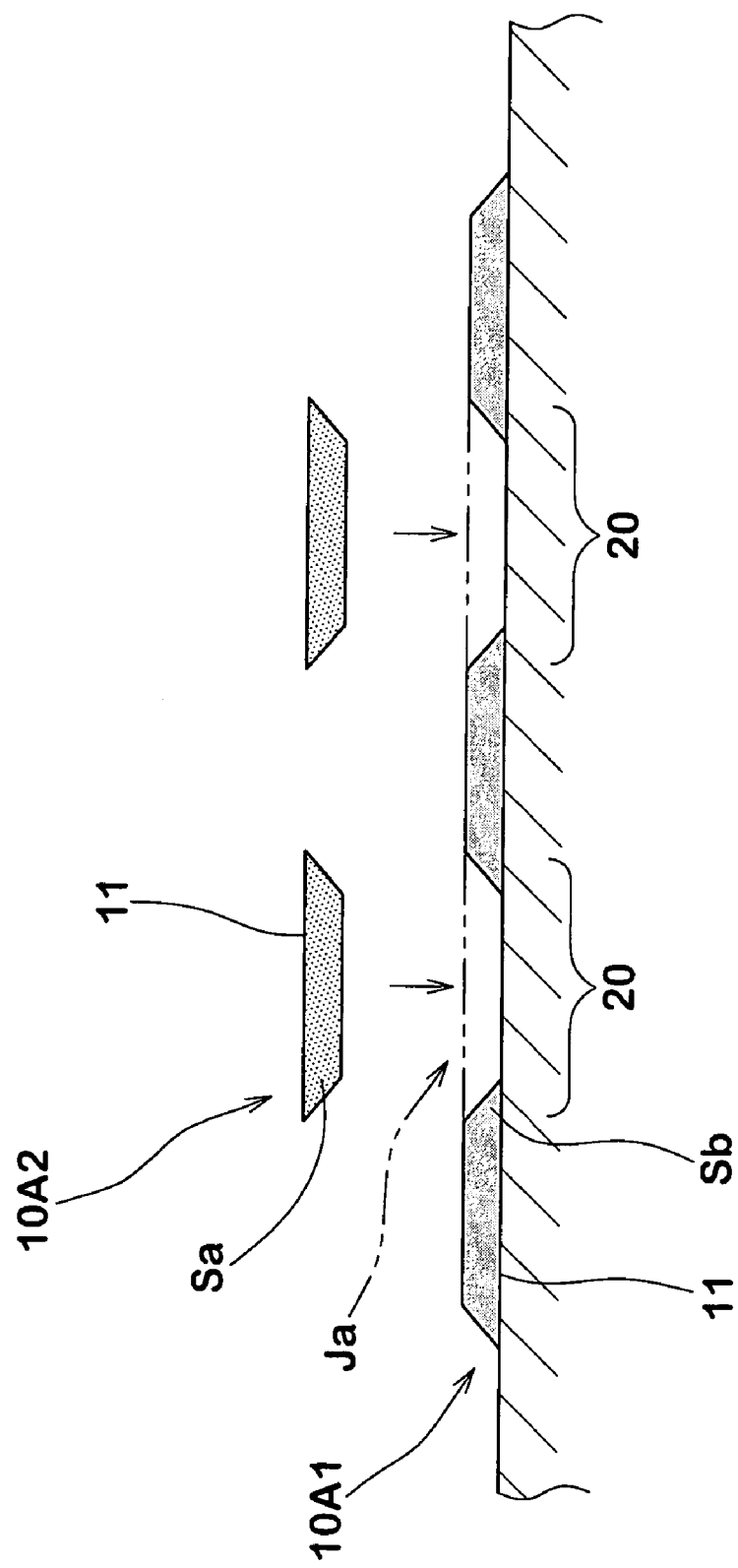
FIG. 9 is a cross sectional view showing the other winding method of the rubber strip.

Further, FIG. 9 shows the other embodiment of a manufacturing method of forming the rubber member by using the rubber strip 10. The rubber strip 10 having the trapezoidal cross sectional shape is used. There are used two kinds of a first rubber strip 10A1 in which the bottom line 11 is directed inward in a radial direction, and a second rubber strip 10A2 in which the bottom line 11 is directed outward in the radial direction. The second rubber strip 10A2 is wound around a spiral gap portion 20 formed between the first rubber strips 10A1 adjacent in a width direction. In accordance with this winding method, since the second rubber strip 10A is fitted into the gap portion 20 without the taper portions Sa and Sb being deformed, it is easy to bond. Further, it is possible to simultaneously wind two rubber strips 10A1 and 10A2 by differentiating the phases in the circumferential direction of the wind start positions in the respective rubber strips 10A1 and 10A2, and it is also possible to shorten a winding time so as to improve productivity.

This method can form various rubber members G, for example, the tread rubber G1, the clinch rubber G4, the belt cushion rubber G5, the bead apex rubber G6 and the like as well as the sidewall rubber G2 and the inner liner rubber G3, by winding the rubber strip 10.

A description is in detail given above of the particularly preferable embodiments in accordance with the present invention, however, the present invention is not limited to the illustrated embodiments, and can be executed by being modified to various aspects.

EXAMPLE 1

A pneumatic tire (tire size 215/45ZR17) in which a tread rubber is formed by using a rubber strip having a specification in Table 1 is manufactured, and a defect generating condition on an outer surface of each of the trial tires and uniformity are compared and evaluated. The other specifications than Table 1 are the same.

(1) Generating Condition of Defect

A condition such as a bare or the like on the tread outer surface is inspected by a visual observation with respect to each of thirty trial tires, and is evaluated on the basis of the following references A, B and C.

A: Bare or the like is not recognized.

B: Small defect is recognized. (light level requiring no retouch)

C: Large defect is recognized. (level requiring retouch)

(2) Uniformity

RFV (O. A.) is measured on the basis of a standard of JASO C607 by using a force variation (FV) tester, and the average value of the thirty trial tires is obtained.

TABLE 1

|  | Conventional Example 1 | Embodiment 1 | Embodiment 2 | Embodiment 3 | Embodiment 4 | Comparative Example 1 | Comparative Example 2 | Embodiment 5 |
|---|---|---|---|---|---|---|---|---|
| Rubber strip | | | | | | | | |
| Cross sectional shape | Rectangle | Scalene triangle | Scalene triangle | Scalene triangle | Scalene triangle | Isosceles triangle | Scalene triangle | Scalene triangle |
| Cross sectional area <mm²> | 40 | 15 | 16 | 13 | 11 | 10 | 18 | 49 |
| Length L0 <mm> | 20 | 15 | 16 | 13 | 11 | 10 | 18 | 35 |
| Thickness T <mm> | 2 | 2 | 2 | 2 | 2 | 2 | 2 | 2.8 |
| Ratio L1/L0 | — | 0.75 | 0.8 | 0.65 | 0.55 | 0.5 | 0.9 | 0.75 |

TABLE 1-continued

|  | Conventional Example 1 | Embodiment 1 | Embodiment 2 | Embodiment 3 | Embodiment 4 | Comparative Example 1 | Comparative Example 2 | Embodiment 5 |
|---|---|---|---|---|---|---|---|---|
| Generating condition of defect | | | | | | | | |
| A | 24 | 26 | 25 | 27 | 25 | 24 | 24 | 26 |
| B | 3 | 3 | 4 | 2 | 4 | 2 | 3 | 3 |
| C | 3 | 1 | 1 | 1 | 1 | 4 | 3 | 1 |
| Uniformity <N> | 50 | 45 | 44 | 42 | 43 | 45 | 49 | 45 |

EXAMPLE 2

A pneumatic tire (tire size 215/45ZR17) in which a sidewall rubber is formed by using a rubber strip having a specification in Table 2 is manufactured, and a handling characteristic of the rubber strip and a defect generating condition on an outer surface of each tires are compared and evaluated. In this case, the rubber strip in accordance with the conventional example uses the rubber strip having a rectangular cross sectional shape ($\alpha=\beta=90°$). The rubber strip in accordance with the embodiment uses the rubber strip having a trapezoidal cross sectional shape ($\alpha=\beta$). The other specifications than Table 2 are the same. Further, each column in Table 2 describes an evaluation of the defect generating condition in an upper section, and an evaluation of the rubber strip handling characteristic in a lower section.

(1) Generating Condition of Defect

A case that the bare or the like is not recognized or the small defect is recognized but is in a light level which is not required to be retouched, is set to a non-defective product, and a case that the defect is large and is in a level which is required to be retouched, is set to a defective product. When manufacturing each 100 tires by way of trial, a case that a rate of the non-defective product is equal to or more than 80% is marked as ○, a case that the rate is less than 80% and equal to or more than 50% is marked as Δ, and a case that the rate is less than 50% is marked as , whereby the evaluation is executed.

(2) Handling Characteristic of Rubber Strip

A case that the rubber member (the sidewall rubber) can be well formed without causing the deformation in the rubber strip even in accordance with the same handling as the conventional one, in the manufacturing step is marked as ○, a case that an attention is necessary for handling and a slight influence is applied to the productivity is marked as Δ, and a case that an attention is necessary for handling and a great influence is applied to the productivity is marked as x, whereby the evaluation is executed.

TABLE 2

(Condition of defect/Handling characteristic)

| | Thickness T | | | |
|---|---|---|---|---|
| Angle α, β | 0.2 mm | 1.0 mm | 2.0 mm | 5.0 mm |
| 90° (Conventional Example 2) | ○ ○ | Δ ○ | x ○ | x ○ |
| 85° (Comparative Example 4) | ○ ○ | Δ ○ | Δ ○ | x ○ |
| 80° (Embodiment 5) | ○ ○ | ○ ○ | ○ ○ | Δ ○ |
| 70° (Embodiment 6) | ○ ○ | ○ ○ | ○ ○ | ○ ○ |
| 60° (Embodiment 7) | ○ ○ | ○ ○ | ○ ○ | ○ ○ |
| 50° (Embodiment 8) | ○ ○ | ○ ○ | ○ ○ | ○ ○ |
| 45° (Comparative Example 5) | Δ ○ | Δ ○ | ○ ○ | ○ ○ |
| 40° (Comparative Example 6) | Δ ○ | Δ ○ | Δ ○ | ○ ○ |
| 35° (Comparative Example 7) | x ○ | Δ ○ | Δ ○ | ○ ○ |

As shown in the table, it can be confirmed that the defect generation can be inhibited even in the case that the rubber thickness T is increased, by using the rubber strip having the trapezoidal cross sectional shape in which the angles α and β are set equal to or less than 60°. In particular, it is possible to increase the rubber thickness T to 2.0 mm, further 5.0 mm while keeping a high non-defective product rate by setting the angles α and β to a range of 45° to 80°, and it is possible to confirm that the productivity can be improved.

What is claimed is:

1. A method for forming a rubber member by overlapping and winding at least one rubber strip in a circumferential direction and in a spiral shape, wherein a cross sectional shape of said rubber strip is a scalene triangular shape defined by a bottom line, a first diagonal line extending from one end of the bottom line to a facing apex and a second diagonal line extending between the other end of said bottom line and said facing apex and being shorter than said first diagonal line, a length L0 of said bottom line in the rubber strip is equal to or more than 5 mm and equal to or less than 50 mm, and a thickness T thereof is equal to or more than 0.2 mm and equal to or less than 5.0 mm, and a length L1 of said first diagonal line along said bottom line is set larger than 0.5 times and equal to or less than 0.8 times the length L0 of said bottom line, wherein said at least one rubber strip is two rubber strips which are a first rubber strip and a second rubber strip having the same cross sectional shape, the first rubber strip is wound from a wind start position close to one end of the rubber member to a wind end position close to the other end of the rubber member, the second rubber strip is wound from a wind start position close to the other end of the rubber member to a wind end position close to the one end of the rubber member, passing each other with respect to said first rubber strip, and in the wind start positions of the first and second rubber strips, said one end of the bottom line of each of the first and second rubber strips is directed to an axially outer side of the rubber member.

2. The method as claimed in claim 1, wherein a length L0 of said bottom line is set to 15 to 40 mm, and a thickness T is set to 0.8 to 3.0 mm.

3. The method as claimed in claim 1, wherein each of apexes of the scalene triangular shape including said facing apex in said rubber strip is chamfered by a circular arc having a radius of 0.2 to 1.0 mm.

* * * * *